(12) United States Patent
Marshall

(10) Patent No.: US 6,590,549 B1
(45) Date of Patent: Jul. 8, 2003

(54) ANALOG PULSE WIDTH MODULATION OF VIDEO DATA

(75) Inventor: Stephen W. Marshall, Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/468,980

(22) Filed: Dec. 21, 1999

Related U.S. Application Data
(60) Provisional application No. 60/114,277, filed on Dec. 30, 1998.

(51) Int. Cl.$^7$ ................................................. G09G 3/34
(52) U.S. Cl. ........................ 345/84; 345/690; 345/581
(58) Field of Search ........................ 345/84, 108, 205, 345/208, 690–691, 770–771, 581, 589, 617

(56) References Cited

U.S. PATENT DOCUMENTS

| | | | | |
|---|---|---|---|---|
| 4,514,763 A | * | 4/1985 | Rindal | 358/167 |
| 4,737,773 A | * | 4/1988 | Kobayashi | 340/707 |
| 5,061,049 A | | 10/1991 | Hornbeck | 359/224 |
| 5,278,652 A | | 1/1994 | Urbanus et al. | 358/160 |
| 5,583,688 A | | 12/1996 | Hornbeck | 359/291 |
| 5,977,942 A | * | 11/1999 | Walker et al. | 345/97 |
| 6,046,830 A | * | 4/2000 | Linke et al. | 359/7 |
| 6,276,801 B1 | * | 8/2001 | Fielding | 348/771 |
| 2001/0011978 A1 | * | 8/2001 | Doherty et al. | 345/84 |

FOREIGN PATENT DOCUMENTS

| | | |
|---|---|---|
| EP | 0 520 481 A2 | 12/1992 |
| EP | 0 598 308 A1 | 5/1994 |
| EP | 0 610 665 A1 | 8/1994 |
| EP | 0 731 444 A1 | 9/1996 |

OTHER PUBLICATIONS

Man, P.F. et al., Elimination of Post–Release Adhesion in Microstructures Using Thin Conformal Fluorocarbon Films, IEEE, The Ninth Annual International Workshop in San Diego, CA, USA, Feb. 11, 1996, pp. 55–60, New York, NY, USA.

* cited by examiner

*Primary Examiner*—Kent Chang
(74) *Attorney, Agent, or Firm*—Charles A. Brill; Wade James Brady, III; Frederick J. Telecky, Jr.

(57) ABSTRACT

A micromirror capable of analog pulse width modulation, and method thereof A capacitor (406) in each micromirror element stores a charge representative of one pixel of image data. A comparator (414) compares the image data signal stored on the capacitor (406) to a reference signal from a reference signal generator (416). Depending on the results of the comparison, the address electrodes (418) of the micromirror are biased to deflect the micromirror (412). As either the image data charge stored on the capacitor (406), or the reference voltage changes, the output of the comparator (414) changes to alter the position of the micromirror (412).

18 Claims, 5 Drawing Sheets

ANALOG PULSE WIDTH MODULATION OF VIDEO DATA

CROSS-REFERENCE TO RELATED APPLICATIONS

This application claims priority under 35 USC §119(e)(1) of provisional application No. 60/114,277 filed Dec. 30, 1998.

The following patents and/or commonly assigned patent applications are hereby incorporated herein by reference:

| Patent No. | Filing Date | Issue Date | Title |
| --- | --- | --- | --- |
| 5,061,049 | Sept. 13, 1990 | Oct. 29, 1991 | Spatial Light Modulator and Method |
| 5,278,652 | Mar. 23, 1993 | Jan. 11, 1994 | DMD Architecture and Timing for Use in a Pulse-Width Modulated Display System |
| 5,583,688 | Dec. 21, 1993 | Dec. 10, 1996 | Multi-Level Digital Micromirror Device |

FIELD OF THE INVENTION

This invention relates to the field of display systems, more particularly to micromirror-based display systems, still more particularly to bistable micromirror-based display systems that perform analog pulse width modulation.

BACKGROUND OF THE INVENTION

Micromechanical devices are small structures typically fabricated on a semiconductor wafer using techniques such as optical lithography, doping, metal sputtering, oxide deposition, and plasma etching which have been developed for the fabrication of integrated circuits.

Digital micromirror devices (DMDs), sometimes referred to as deformable micromirror devices, are a type of micromechanical device. Other types of micromechanical devices include accelerometers, pressure and flow sensors, gears and motors. While some micromechanical devices, such as pressure sensors, flow sensors, and DMDs have found commercial success, other types have not yet been commercially viable.

Digital micromirror devices are primarily used in optical display systems. In display systems, the DMD is a light modulator that uses digital image data to modulate a beam of light by selectively reflecting portions of the beam of light to a display screen. While analog modes of operation are possible—that is modes in which the mirror deflection is a function of the input data or bias voltage—DMDs typically operate in a digital bistable mode of operation in which the mirror is fully deflected at all times regardless of the image data applied to the mirror.

Micromirrors have evolved rapidly over the past ten to fifteen years. Early devices used a deformable reflective membrane which, when electrostatically attracted to an underlying address electrode, dimpled toward the address electrode. Schlieren optics illuminate the membrane and create an image from the light scattered by the dimpled portions of the membrane. Schlieren systems enabled the membrane devices to form images, but the images formed were very dim and had low contrast ratios, making them unsuitable for most image display applications.

Later micromirror devices used flaps or diving board-shaped cantilever beams of silicon or aluminum, coupled with dark-field optics to create images having improved contrast ratios. Flap and cantilever beam devices typically used a single metal layer to form the top reflective layer of the device. This single metal layer tended to deform over a large region, however, which scattered light impinging on the deformed portion. Torsion beam devices use a thin metal layer to form a torsion beam, which is referred to as a hinge, and a thicker metal layer to form a rigid member, or beam, typically having a mirror-like surface: concentrating the deformation on a relatively small portion of the DMD surface. The rigid mirror remains flat while the hinges deform, minimizing the amount of light scattered by the device and improving the contrast ratio of the device.

Recent micromirror configurations, called hidden-hinge designs, further improve the image contrast ratio by fabricating the mirror on a pedestal above the torsion beams. The elevated mirror covers the torsion beams, torsion beam supports, and a rigid yoke connecting the torsion beams and mirror support, further improving the contrast ratio of images produced by the device.

All micromirror-based projection displays use pulse-width modulation to control the amount of light that reaches each pixel of an image plane. Typical pulse width modulation schemes divide a frame period into binary bit periods. Each image data bit in the input data word controls the operation of the mirror during one bit period. Thus, if the bit is active, the mirror is turned on during the bit period and light from a light source is directed to the image plane during the bit period. If the image data bit is not active, the mirror is turned off during the bit period and light from the light source is directed away from the image plane during the bit period. The human eye, or other photoreceptor, integrates the energy directed to each pixel to create the perception of intermediate intensity levels. Typical binary pulse width modulation systems divide the larger bit periods into two or more bit-splits which are distributed throughout the frame period. Spreading the contribution of the large data bits throughout the frame period eliminates some of the artifacts created by the binary pulse width modulator schemes.

While not described above, the creation of full-color image requires either three DMD spatial light modulators simultaneously producing monochromatic images. The three primary monochromatic images are superimposed to create a single full-color image. Alternatively, a single DMD is used in combination with a color wheel or other sequential filter mechanism. The color wheel divides the white light beam into three primary color monochromatic light beams that are sequentially modulated to create single-color sub-images. The three primary color monochromatic images are integrated by the viewer to create the perception of a single full-color image.

Although binary pulse width modulation provides a convenient means to create intermediate intensity levels and utilizes binary data that is easily processed to improve the displayed images, binary pulse width modulation systems require a very large amount of memory and processing hardware. Thus, although DMD-based display systems are capable of creating virtually perfect images, the cost of such image quality drives the DMD-based projection system out of the reach of many consumers. What is needed is a method and system for creating high-quality images with display systems having much less processing power

SUMMARY OF THE INVENTION

Objects and advantages will be obvious, and will in part appear hereinafter and will be accomplished by the present invention which provides a method and system for analog pulse width modulation of a spatial light modulator. One embodiment of the claimed invention provides a method of operating an element of the spatial light modulator. The method comprises the steps of providing a pixel data signal and a reference signal to the element, comparing the pixel data signal and the reference signal as at least one of the signals changes, and operating the element according to the results of the comparison. The reference voltage is typically a ramping voltage that also performs a degamma operation.

According to another embodiment of the disclosed invention, a micromirror device is provided. The micromirror device comprises at least two address electrodes, a deflectable mirror element suspended above the address electrodes, a capacitor for storing charge representing an image data signal, a reference voltage input, and a comparator receiving the image data signal and the reference voltage. The comparator compares the reference voltage input and the image data signal and provides address voltages to the address electrodes to cause a deflection of the deflectable mirror element.

Yet another embodiment of the disclosed invention provides the analog pulse width modulated micromirror cell in a display system. The display system comprises a light source for providing a beam of light along a light path, an array of micromirror cells on the light path, each micromirror cell operable to selectively reflect incident light along a projection path, a controller providing the image data signal to the micromirror array, and projection optics on the projection path. The projection optics focus the selectively reflected incident light on an image plane. Each micromirror cell in the display comprises: at least two address electrodes, a deflectable mirror element suspended above the address electrodes, a capacitor storing a charge representative of an image data signal, a reference voltage input, and a comparator receiving the image data signal and the reference voltage, the comparator comparing the reference voltage input and image data signals and providing address voltages to the two address electrodes to cause a deflection of the deflectable element.

The disclosed analog pulse width modulation scheme and micromirror greatly reduce the hardware heretofore required to produce a pulse width modulated video image using a micromirror device. The reduction in circuitry and frame memory greatly reduces the cost of micromirror based display systems. Furthermore, many of the artifacts created by the binary time division modulation schemes are eliminated.

BRIEF DESCRIPTION OF THE DRAWINGS

For a more complete understanding of the present invention, and the advantages thereof, reference is now made to the following descriptions taken in conjunction with the accompanying drawings, in which:

FIG. 5c is a plot showing the mirror position for a micromirror cell having the pixel data of FIG. 5b and the reference voltage input of FIG. 5a.

FIG. 6d is a plot showing the mirror position for a micromirror cell having the pixel data of FIG. 6b and the reference voltage input of FIG. 6a.

FIG. 6e is a plot showing the mirror position for a micromirror cell having the pixel data of FIG. 6c and the reference voltage input of FIG. 6a.

DETAILED DESCRIPTION OF THE PREFERRED EMBODIMENTS

A new modulation technique and micromirror has been developed to allow analog pulse width modulation of each element of a spatial light modulator. The ability to receive analog image data eliminates, or significantly reduces, the image processing hardware typically required to produce digital pulse width modulated images. Thus, the methods and systems disclosed herein enable low-cost spatial light modulator-based systems. The methods and systems disclosed are particularly useful for providing low-cost micromirror-based display systems since the digital micromirror devices are not easily driven in an analog manner.

Although the following description specifically describes the operation of the disclosed invention in terms of digital micromirror devices, it is understood that such description is for purposes of illustration and not for purposes of limitation. The inventive aspects described are equally applicable to other spatial light modulators such as liquid crystal devices.

Figure 1:
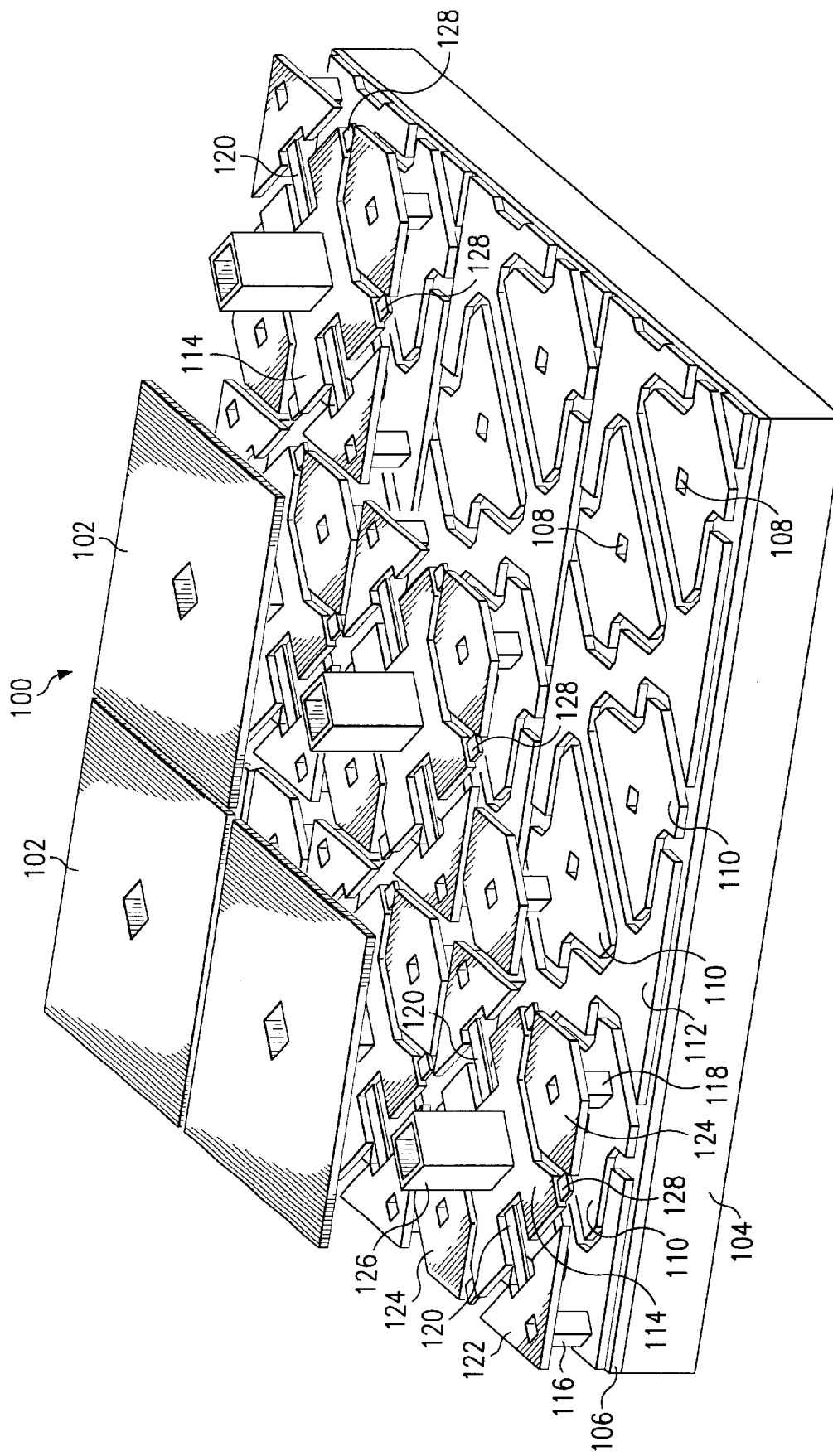
FIG. 1 is a perspective view of a small portion of a micromirror array.
Figure 2:
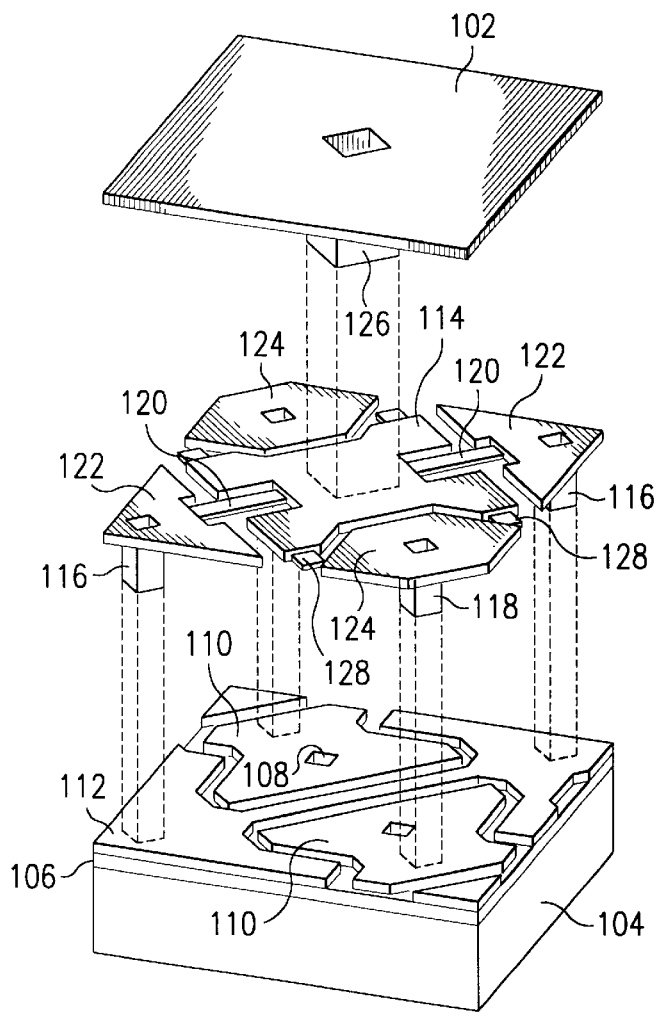
FIG. 2 is an exploded perspective view of a single micromirror element from the micromirror array of FIG. 1.

A typical hidden-hinge DMD 100 is actually an orthogonal array of DMD cells, or elements. This array often includes more than a thousand rows and columns of DMD cells. FIG. 1 shows a small portion of a DMD array with several mirrors 102 removed to show the underlying mechanical structure of the DMD array. FIG. 2 is an exploded view of a single DMD element further detailing the relationships between the DMD structures.

A DMD is fabricated on a semiconductor, typically silicon, substrate 104. Electrical control circuitry is typically fabricated in or on the surface of the semiconductor substrate 104 using standard integrated circuit process flows. This circuitry typically includes structures necessary to receive image data and to generate mirror control signals dependent on the image data. Voltage driver circuits to drive bias and reset signals to the mirror superstructure may also be fabricated on the DMD substrate, or may be external to the DMD. For the purposes of this disclosure, addressing circuitry is considered to include any circuitry, including direct voltage connections, used to control the direction of rotation of a DMD mirror. The addressing circuitry will be discussed in much more detail below.

The silicon substrate 104 and any necessary metal interconnection layers are isolated from the DMD superstructure by an insulating layer 106 which is typically a deposited silicon dioxide layer on which the DMD superstructure is formed. Holes, or vias, are opened in the oxide layer to allow electrical connection of the DMD superstructure with the electronic circuitry formed in the substrate 104.

The first layer of the superstructure is a metalization layer, typically the third metalization layer and therefore often called M3. The first two metalization layers are typically required to interconnect the circuitry fabricated on the substrate. The third metalization layer is deposited on the insulating layer and patterned to form address electrodes 110 and a mirror bias connection 112. Some micromirror designs have landing electrodes which are separate and distinct structures but are electrically connects to the mirror bias connection 112. Landing electrodes limit the rotation of the mirror 102 and prevent the rotated mirror 102 or hinge yoke 114 from touching the address electrodes 110, which have a voltage potential relative to the mirror 102. If the mirror 102 contacts the address electrodes 110, the resulting short circuit could fuse the torsion hinges 116 or weld the mirror 102 to the address electrodes 110, in either case ruining the DMD.

Since the same voltage is always applied both to the landing electrodes and the mirrors 102, the mirror bias connection and the landing electrodes are preferably combined in a single structure when possible. The landing electrodes are combined with the mirror bias connection 112 by including regions on the mirror bias/reset connection 112, called landing sites, which mechanically limit the rotation of the mirror 102 by contacting either the mirror 102 or the torsion hinge yoke 114. These landing sites are often coated with a material chosen to reduce the tendency of the mirror 102 and torsion hinge yoke 114 to stick to the landing site.

Mirror bias/reset voltages travel to each mirror 102 through a combination of paths using both the mirror bias/reset metalization 112 and the mirrors and torsion beams of adjacent mirror elements. The landing electrode/mirror bias 112 configuration shown in FIG. 1 is ideally suited to split reset applications since the DMD elements are easily segregated into electrically isolated rows or columns simply by isolating the mirror bias/reset layer between the subarrays. The mirror bias/reset layer of FIG. 1 is shown divided into rows of isolated elements.

A first layer of supports, typically called spacervias, is fabricated on the metal layer forming the address electrodes 110 and mirror bias connections 112. These spacervias, which include both hinge support spacervias 116 and upper address electrode spacervias 118, are typically formed by spinning a thin spacer layer over the address electrodes 110 and mirror bias connections 112. This thin spacer layer is typically a 1 $\mu$m thick layer of positive photoresist. After the photoresist layer is deposited, it is exposed, patterned, and deep UV hardened to form holes in which the spacervias will be formed. This spacer layer and a thicker spacer layer used later in the fabrication process are often called sacrificial layers since they are used only as forms during the fabrication process and are removed from the device prior to device operation.

A thin layer of metal is sputtered onto the spacer layer and into the holes. An oxide is then deposited over the thin metal layer and patterned to form an etch mask over the regions that later will form hinges 120. A thicker layer of metal, typically an aluminum alloy, is sputtered over the thin layer and oxide etch masks. Another layer of oxide is deposited and patterned to define the hinge yoke 114, hinge cap 122, and the upper address electrodes 124. After this second oxide layer is patterned, the two metals layers are etched simultaneously and the oxide etch stops removed to leave thick rigid hinge yokes 114, hinge caps 122, and upper address electrodes 124, and thin flexible torsion beams 120.

A thick spacer layer is then deposited over the thick metal layer and patterned to define holes in which mirror support spacervias 126 will be formed. The thick spacer layer is typically a 2 $\mu$m thick layer of positive photoresist. A layer of mirror metal, typically an aluminum alloy, is sputtered on the surface of the thick spacer layer and into the holes in the thick spacer layer. This metal layer is then patterned to form the mirrors 102 and both spacer layers are removed using a plasma etch.

Once the two spacer layers have been removed, the mirror is free to rotate about the axis formed by the torsion hinge. Electrostatic attraction between an address electrode 110 and a deflectable rigid member, which in effect form the two plates of an air gap capacitor, is used to rotate the mirror structure. Depending on the design of the micromirror device, the deflectable rigid member is the torsion beam yoke 114, the beam or mirror 102, a beam attached directly to the torsion hinges, or a combination thereof. The upper address electrodes 124 also electrostatically attract the deflectable rigid member.

The force created by the voltage potential is a function of the reciprocal of the distance between the two plates. As the rigid member rotates due to the electrostatic torque, the torsion beam hinges resist deformation with a restoring torque which is an approximately linear function of the angular deflection of the torsion beams. The structure rotates until the restoring torsion beam torque equals the electrostatic torque or until the rotation is mechanically blocked by contact between the rotating structure and a fixed component. As discussed below, most micromirror devices are operated in a digital mode wherein sufficiently large bias voltages are used to ensure full deflection of the micromirror superstructure.

Micromirror devices are generally operated in one of two modes of operation. The first mode of operation is an analog mode, sometimes called beam steering, wherein the address electrode is charged to a voltage corresponding to the desired deflection of the mirror. Light striking the micromirror device is reflected by the mirror at an angle determined by the deflection of the mirror. Depending on the voltage applied to the address electrode, the cone of light reflected by an individual mirror is directed to fall outside the aperture of a projection lens, partially within the aperture, or completely within the aperture of the lens. The reflected light is focused by the lens onto an image plane, with each individual mirror corresponding to a fixed location on the image plane. As the cone of reflected light is moved from completely within the aperture to completely outside the aperture, the image location corresponding to the mirror dims, creating continuous brightness levels.

The second mode of operation is a digital mode. When operated digitally, each micromirror is fully deflected in either of the two directions about the torsion beam axis. Digital operation uses a relatively large voltage to ensure the mirror is fully deflected. Since it is advantageous to drive the address electrode using standard logic voltage levels, a bias voltage, typically a negative voltage, is applied to the mirror metal layer to increase the voltage difference between the address electrodes and the mirrors. Use of a sufficiently large mirror bias voltage—a voltage above what is termed the collapse voltage of the device—ensures the mirror will deflect to the closest landing electrodes even in the absence of an address voltage. Therefore, by using a large mirror bias voltage, the address voltages need only be large enough to deflect the mirror slightly.

To create an image using the micromirror device, the light source is positioned at an angle equal to twice the angle of rotation so that mirrors rotated toward the light source reflect light in a direction normal to the surface of the micromirror device and into the aperture of a projection lens—creating a bright pixel on the image plane. Mirrors rotated away from the light source reflect light away from the projection lens—leaving the corresponding pixel dark. Intermediate brightness levels are created by pulse width modulation techniques in which the mirror is rapidly and repetitively rotated on and off. The duty cycle of the mirror determines the quantity of light reaching the image plane. The human eye integrates the light pulses and the brain perceives a flicker-free intermediate brightness level.

As described above, prior art pulse width modulation schemes divide each single-color frame period into several bit periods—one bit period for each data bit to be displayed. The mirrors are turned on or off each bit period depending on the image data bit being displayed. A lot of hardware is required to format the data from the raster-scan format provided by most video sources to the bit plane format required for binary pulse width modulation using a micromirror device.

Figure 3:
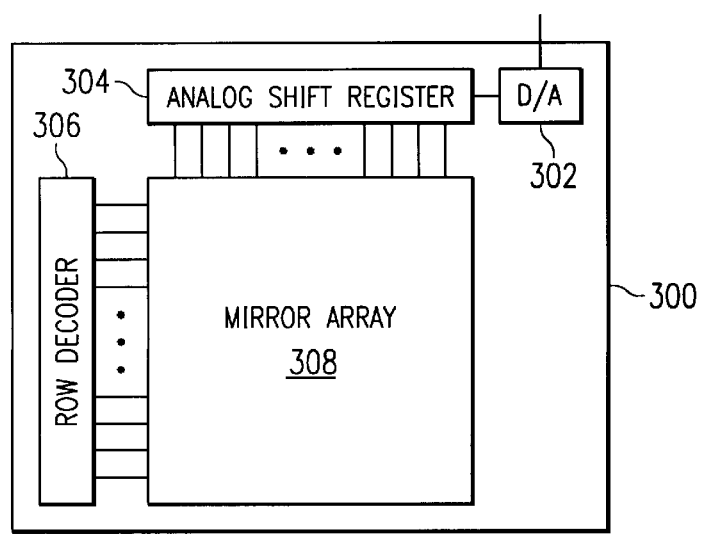
FIG. 3 is a plan view of a digital micromirror device according to one embodiment of the present invention.

FIG. 3 is a plan view of a digital micromirror device 300 according to one embodiment of the present invention. Although an analog voltage is used by the device of FIG. 3, the term digital micromirror device is retained because the mirror itself is operated digitally—that is, the mirror is fully deflected in either the "on" or "off" direction at all times. The DMD 300 shown in FIG. 3 includes an optional digital to analog converter 302 to convert a digital image data stream into an analog signal. The preferred embodiment receives an analog input, and therefore does not require the digital to analog converter 302.

The output of the digital to analog converter 302 is received by an analog shift register 304. The analog shift register 304 typically is a charge coupled device (CCD) that periodically samples the analog input and transfers a voltage or charge representing the analog input from cell to cell each period. For example, if DMD has a mirror array 308 that is 1280 mirrors wide and 1024 mirrors high, the analog shift register 304 contains at least 1280 cells, each capable of holding an analog signal representative of one pixel of the analog input video data.

After an entire row of data has been shifted into the analog shift register 304, a row decoder 306, or row counter, selects a row of the mirror array 308 into which the analog data is transferred. The output of the row decoder 306 operates like a write enable signal in a memory array to transfer an entire row of data into the mirror array 308. Although not shown in FIG. 3, some embodiments may use two or more analog shift registers 304 alternately in a ping-pong fashion depending on the speed at which the analog data can be transferred to the mirror array 308.

The micromirror device 300 of FIG. 3 can easily accept interlaced or progressive scan video data. If interlaced data is input, the row decoder 306 can increment by two so that the interlaced format is retained. Alternatively, the row decoder 306 selects two modulator rows to receive each line of image data. Loading each line of interlaced image data into two modulator rows performs a crude line-doubling de-interlace conversion. Since the invention described herein is equally applicable to interlaced and progressive scan data formats, the terms field and frame will be used interchangeably throughout this disclosure with the understanding that the proper term and signal timing depends on the input video stream.

Figure 4A:
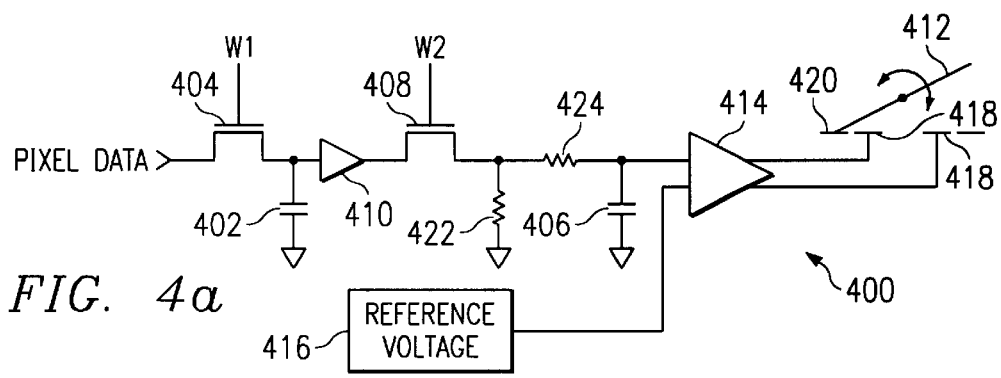
FIG. 4a is a schematic view of one embodiment of one element in the digital micromirror array of FIG. 3 operable to perform analog pulse width modulation.

FIG. 4a is a schematic view of one embodiment of a micromirror element, or cell, operable to perform analog pulse width modulation. In FIG. 4a, pixel data from the analog shift register is written to a first capacitor 402 when the write signal from the row decoder turns transistor 404 on. After the first transistor 404 is turned off, a second transistor 408 is turned on by a field write signal to allow a transfer of charge from the first capacitor 402 to a second capacitor 406. The use of two transistors 404, 408 and two capacitors 402, 406 is optional, but allows one row of data to be displayed while a second row of data is being loaded. Without the second transistor and capacitor, it may be necessary to use a blanking period while a field of data is being loaded.

Also included in FIG. 4a is a buffer amplifier 410. Buffer 410 is used to source or sink current as necessary to properly charge capacitor 406. Without buffer 410, the charge stored on capacitor 402 would be averaged with the charge stored on capacitor 406 when transistor 408 is turned on. Averaging the charge on the two capacitors would allow image data from one frame to corrupt image data in the next frame. A buffer on each output of the analog shift register performs the same function when charge is transferred to capacitor 402.

Other means of clearing the capacitors 402, 406 may be used. One alternate method uses a resistor 422 to bleed the charge to ground. If a large resistor 422 is slowly but constantly discharging the capacitor, the micromirror cell with exhibit a slow brightness decay similar to the persistence of a cathode ray tube. Alternatively, a small resistor is connected to the capacitor immediately before the data write operation to quickly discharge the capacitor. Of course, both a decay resistor and a rapid discharge resistor could be used.

Another change to the sample and hold circuit on the input of each comparator allows the modulator cell to perform recursive temporal filtering on the input image data. To implement this change, a resistor is added in series with the capacitor 406. The resistor limits the discharge of the capacitor 406 and allows data from one frame to influence the operation of the micromirror in the next frame. The larger the value of the resistor 424, the slower the charge on the capacitor 406 can be changed and the more influence previous video data will have on later video frames. Typically neither resistor 422 or resistor 424 are used.

Once a field or frame of data is stored in capacitor 406, the data controls the operation of the cell's micromirror 412.

The data stored on the capacitor 406 is provided to one input of a complementary output comparator 414. A reference voltage from a reference voltage generator 416 is provided to the other input of the comparator 414. The complementary outputs of the comparator 414 are used to drive the address electrodes 418 of the micromirror. The complementary output comparator 414 may be any circuit that performs a comparison between the two input signals and drives the address electrodes 418. For example, a single-ended comparator may be used to drive analog switches, pass transistors, or other logic that in turn provides the voltages to the address electrodes 418.

Depending on the relative magnitudes of the voltages provided to the comparator inputs, one address electrode 418 is driven high while the other address electrode 418 is driven low. Reference voltage generator 416 is typically not part of each micromirror cell, but instead a single reference voltage generator that provides a reference voltage to many micromirror cells.

The electrostatic attraction between the micromirror 412 and the address electrodes 418 causes the micromirror 412 to rotate toward the side having the greatest electrostatic attraction. Since the electrostatic attraction is a function of both the voltage differential and the distance between the electrode 418 and the micromirror 412, even a small voltage differential between the micromirror 412 and the closest address electrode 418 may be sufficient to hold the micromirror against landing electrode 420. Therefore, the mirror bias is generally set equal to one output of the comparator so that there will be no voltage differential on one side of the micromirror 412.

Figure 4B:
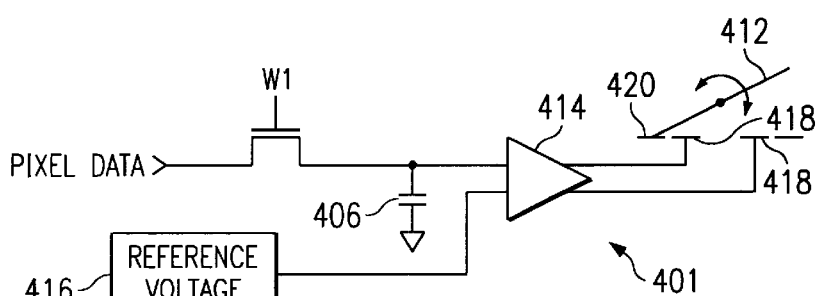
FIG. 4b is a schematic view of another embodiment of one element in the digital micromirror array of FIG. 3 operable to perform analog pulse width modulation.

FIG. 4b is a schematic view of another embodiment of a micromirror element 401, or cell, operable to perform analog pulse width modulation. The embodiment of FIG. 4b is similar to the embodiment shown in FIG. 4a, but does not include two capacitors and write transistors, or the resistors used to filter and decay the charge applied to the capacitor.

Figure 5A:
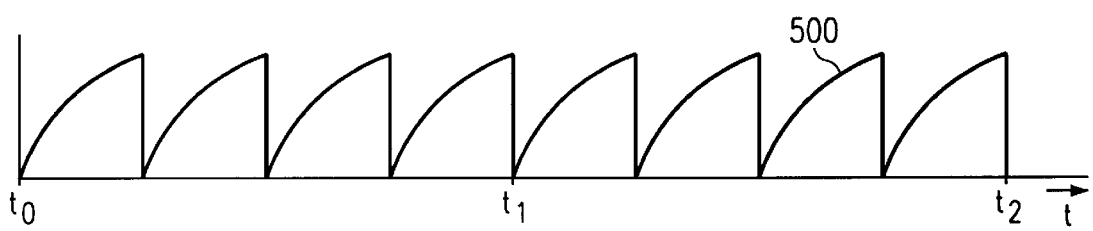
FIG. 5a is a plot of the output reference voltage generator of FIGS. 4a and 4b.

FIG. 5a shows one possible waveform for the output of the reference voltage generator of FIG. 4a. The waveform 500 shown in FIG. 5a is a modified sawtooth waveform. The curve of the rising portion of the waveform performs a degamma function by altering the duty cycle of the micromirror for a given image data value. Because the degamma waveform is a smooth analog waveform, the false contouring problems associated with dim data values do not occur.

The reference voltage waveform 500 typically is a periodic function with a frequency that is a multiple of the frame rate. The use of a reference voltage with a frequency higher than the frame rate allows helps to reduce flicker, and performs a function similar to the bit period splitting techniques of the prior art. FIG. 5a shows a reference voltage that repeats four times every frame. A typical reference voltage repeats sixteen times each frame.

The magnitude of the reference voltage 500 and of the pixel image data signal is not critical. Voltages as low as 1 volt may be used and still provide the equivalent of 8 bits of image data with 4 mV steps. Higher voltages will require more power, while lower voltage require increase precision and improved isolation from surrounding circuitry in order to avoid degrading the image.

The reference voltage generator may use analog circuitry to generate the waveform, a digital to analog converter for converting waveform data stored in a memory into a reference voltage, or any other type of circuitry for generating the reference voltage waveform.

Figure 5B:
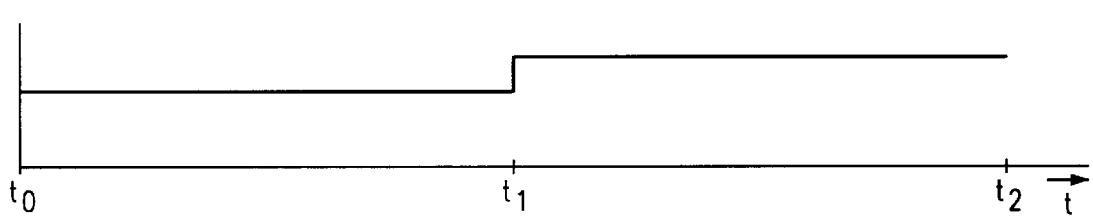
FIG. 5b is a plot of pixel voltage data for a single pixel over two frames.
Figure 5C:
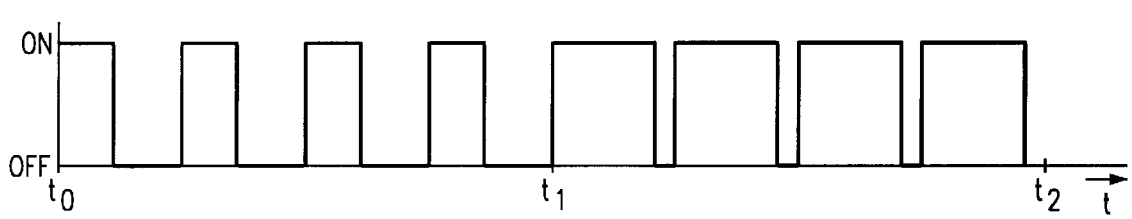

FIG. 5b is a voltage waveform representing image data stored on capacitor 406 of FIG. 4a. As shown in FIG. 5b, the image data is constant for one frame, $t_0$–$t_1$ and $t_1$–$t_2$. FIG. 5c shows the position of the micromirror as determined by the waveforms of FIG. 5a and 5b. As seen in FIG. 5c, the duty cycle of the micromirror is increased during the four reference voltage pulses of the second frame compared to the four reference voltage pulses of the first frame.

Referring back to FIG. 4a, the use of resistor 422 creates a decay or persistence effect because the mirror on periods during each frame are gradually shortened. Alternatively, the decay of the signal stored on capacitor 406 allows the use of a constant reference voltage. Using a constant reference voltage with a decaying charge on the capacitor 406 will only create one mirror on period each frame. To create additional mirror on periods within each frame period, transistor 408 is turned on several times during the frame period to refresh the charge on capacitor 406.

Figure 6A:
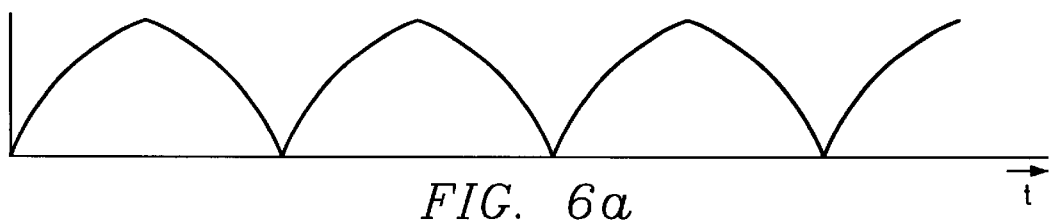
FIG. 6a is a plot of the output reference voltage generator of FIGS. 4a and 4b.

FIG. 6a shows a reference voltage waveform 600 according to a second embodiment of the disclosed invention. As shown in FIG. 6a, the reference voltage repeatedly ramps both up and down. The advantage of the waveform of FIG. 6a is that the energy from each on mirror is centered about the same point in time regardless of the image data. While the waveform shown in FIG. 6a may or may not provide more pleasing video images, it improves the output of printer-type devices that can also utilize the disclosed analog pulse width modulation techniques.

Figure 6B:
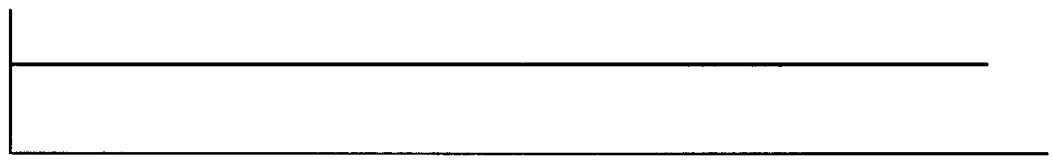
FIG. 6b is a plot of pixel voltage data for a first pixel.
Figure 6C:
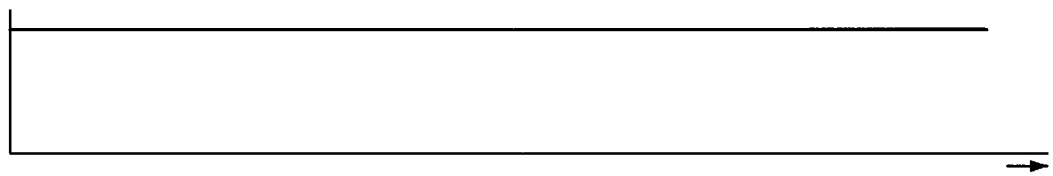
FIG. 6c is a plot of pixel voltage data for a second pixel.
Figure 6D:
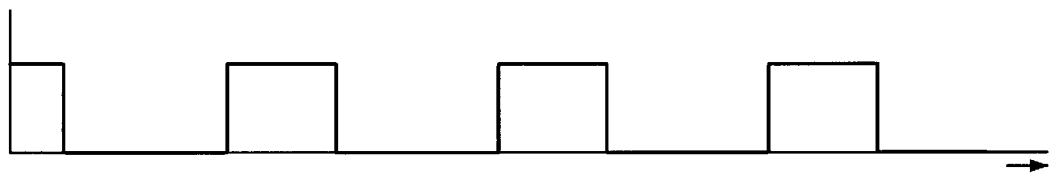
Figure 6E:
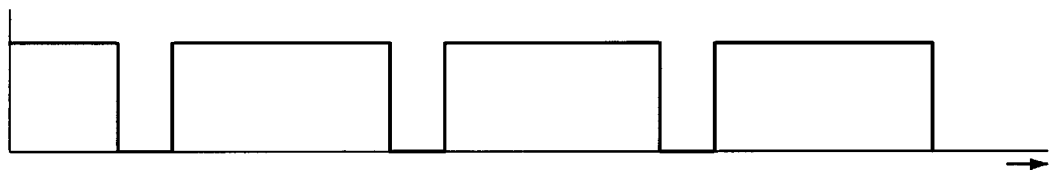

A voltage waveform representing the data in a first micromirror cell is shown in FIG. 6b. FIG. 6c shows a voltage waveform representing data in a second micromirror cell. As seen in FIGS. 6d and 6e, while the two micromirror cells have different duty cycles the periods in which the mirrors are "on" are centered relative to each other. Since most DMD-based printers print a single line of data on a moving photoreceptor, centering the output from each micromirror element regardless of the data being projected improves alignment of the pixels in each image row.

The reference reset voltage also provides an ideal means of adjusting the brightness and contrast of the image. Since the reference voltage is applied to all of the image pixels, a change to the reference voltage waveform will alter the duty cycle of all of the micromirror elements. Using the polarities shown in FIG. 6, an upward shift in the reference voltage will reduce the duty cycle of the micromirror and dim the projected image. Likewise, a downward shift will increase the brightness of the projected image. Similarly, only shifting one end of the reference voltage waveform, or shift in both ends in opposite directions, will change the contrast of the projected image.

The above description of the analog pulse width modulation micromirror relies on the ability of the mirror to spontaneously reset when the output of the comparator changes states. It is well known in the art that micromirrors tend to experience stiction problems. Stiction is due to an attractive force generated between the micromirror and a landing electrode when the micromirror is in contact with the landing electrode. Stiction can overcome both the restorative torque of the torsion hinge and the electrostatic forces and prevent the micromirror from changing states. Passivation coatings are used to reduce this attraction. Even with the use of passivation coatings, however, it may be necessary to use some sort of a reset voltage to spring the micromirror away from the landing electrode.

Reset schemes generally utilize one or more mirror bias pulses to store energy in the hinges of the micromirror, and changes to both the address electrode voltage and the mirror bias voltage. Changing the bias voltages applied to the micromirror and the address electrodes, generally by temporarily increasing the address voltages, is intended to increase the attraction between the address electrodes and the micromirror.

Figure 7:
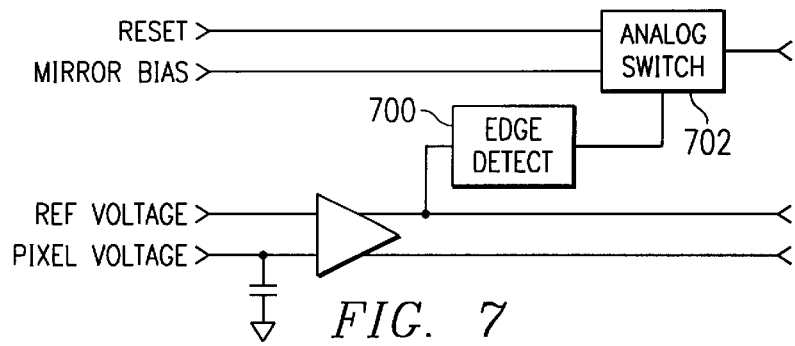
FIG. 7 is a schematic view of one micromirror cell embodiment showing the selection of a global reset waveform.
Figure 8:
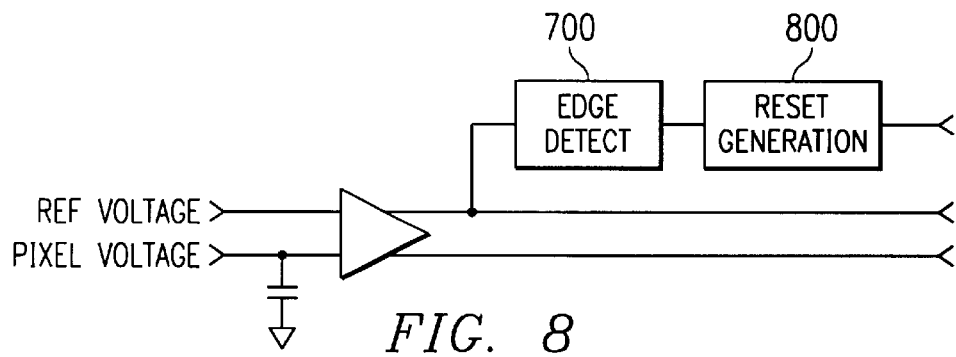
FIG. 8 is a schematic view of one micromirror cell embodiment showing the local generation of a reset waveform.

FIGS. 7 and 8 both depict schematic views of different embodiments showing how to apply an optional reset voltage to the mirror bias signal during a reset period. In FIG. 7, an edge detector 700 outputs a signal whenever the comparator changes states—that is, whenever the micromirror should be reset. The output of the edge detector is used by an analog switch to enable a reset voltage waveform to be applied to the micromirror superstructure. The reset voltage waveform is provided to the entire micromirror array, but is only provided to the micromirror when the comparator changes states. The reset voltage waveform provides a large number of reset opportunities each frame, for example 256 reset pulses each frame. Although the reset circuitry shown in FIG. 7 eliminates the effects of sticking, it reintroduces many of the quantization artifacts, such as false contouring, caused by the discrete reset events.

A better means of avoiding sticking mirrors that does not introduce the quantization artifacts is shown in FIG. 8. The circuit of FIG. 8 is similar to the circuit of FIG. 9, except that the edge detector 700 triggers a reset generator 800 that provides a unique reset waveform for each element in the micromirror array. While the circuit shown in FIG. 8 avoids the quantization problems introduced in FIG. 7, the circuitry required to generate a unique reset waveform typically will not fit under each micromirror cell.

Figure 9:
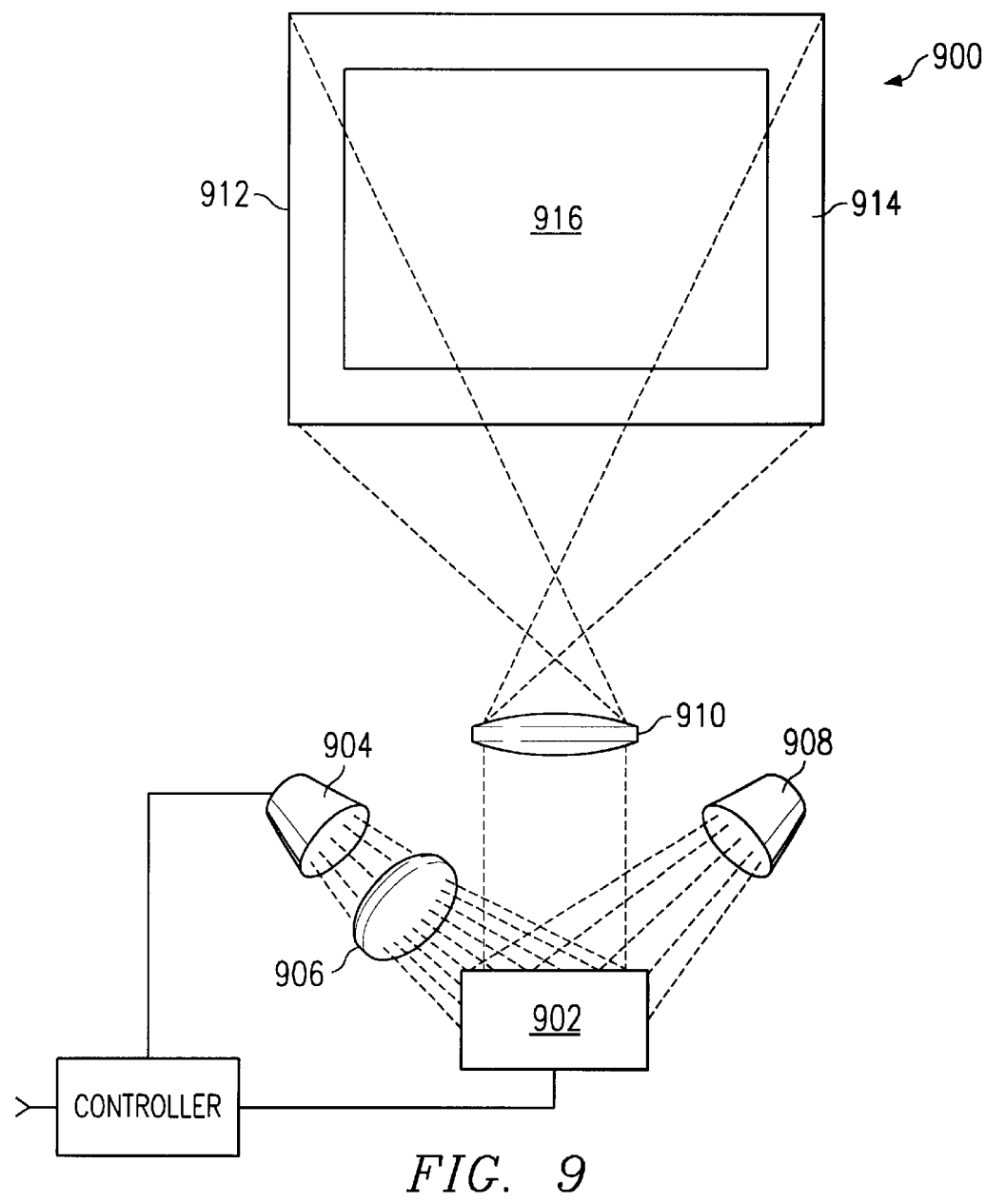
FIG. 9 is a schematic view of a micromirror-based projection system utilizing an analog pulse width modulated micromirror device according to one embodiment of the present invention.

FIG. 9 is a schematic view of an image projection system 900 using an analog pulse width modulated micromirror 902 according to the present invention. In FIG. 9, light from light source 904 is focused on the improved micromirror 902 by lens 906. Although shown as a single lens, lens 906 is typically a group of lenses and mirrors which together focus and direct light from the light source 904 onto the surface of the micromirror device 902. Image data and reference voltage signals from controller 914 cause the mirrors of the micromirror device to rotate on and off according to the value of the pixel's image data signal. Mirrors on the micromirror device that are rotated to an off position reflect light to a light trap 908, or simply away from the aperture of lens 910, while mirrors rotated to an on position reflect light to projection lens 910. Projection lens 910 is shown as a single lens for simplicity. Projection lens 910 focuses the light modulated by the micromirror device 902 onto an image plane or screen 912.

The display system shown in FIG. 9 has the advantage of not requiring any frame memory, when three parallel micromirror devices are used, and reducing the amount of data processing required. Low-cost systems, however, prefer to use the time-sequential methods described above to create full color images using only one or two spatial light modulators. These one or two-chip display systems require a buffer memory to store image data for one or more inactive primary colors while the one or two active primary colors are being displayed.

Thus, although there has been disclosed to this point a particular embodiment for a method and system for using analog pulse width modulation with a digital micromirror, it is not intended that such specific references be considered as limitations upon the scope of this invention except insofar as set forth in the following claims. Furthermore, having described the invention in connection with certain specific embodiments thereof, it is to be understood that further modifications may now suggest themselves to those skilled in the art, it is intended to cover all such modifications as fall within the scope of the appended claims.

What is claimed is:

1. A method of operating an element of a spatial light modulator, said method comprising the steps of:
   providing a pixel data signal to said element of said spatial light modulator;
   providing a reference signal to said element of said spatial light modulator;
   comparing said pixel data signal and said reference signal during at least one frame period as at least one of said pixel data signal and said reference signal change;
   operating said element of said spatial light modulator according to the results of said comparing step to form an image; and
   altering said reference signal after at least one frame period to alter at least one image parameter selected from the group consisting of image brightness and image contrast in said image formed by said operating step.

2. The method of claim 1, said step of providing said pixel data signal further comprising providing said pixel data signal once each field.

3. The method of claim 1, further comprising the step of decaying said pixel data signal during a frame time.

4. The method of claim 1, said step of providing a reference signal further comprising providing a changing reference signal.

5. The method of claim 1, said step of providing a reference signal further comprising providing a gradually increasing reference signal.

6. The method of claim 1, said step of providing a reference signal further comprising providing a gradually decreasing reference signal.

7. The method of claim 1, said step of providing a reference signal further comprising providing a gradually increasing then gradually decreasing reference signal.

8. The method of claim 1, further comprising the step of selecting a global reset waveform upon a change in an output of said comparing step.

9. The method of claim 1, further comprising the step of generating a reset waveform upon a change in an output of said comparing step.

10. A micromirror device comprising:
    at least two address electrodes;
    a deflectable mirror element suspended above said at least two address electrodes;
    a capacitor for storing charge representing an image data signal;
    a reference voltage generator for generating a reference voltage, said reference voltage generator operable to alter said reference voltage to adjust at least one image parameter selected from the group consisting of image brightness and image contrast; and
    a comparator receiving said image data signal and said reference voltage, said comparator for comparing said reference voltage input with said image data signal for at least one frame period, and for providing address voltages to said at least two address electrodes to cause a deflection of said deflectable mirror element, wherein said alteration of said reference voltage after said at least one frame period adjusts said at least one parameter.

11. The micromirror device of claim 10, said micromirror cell further comprising an edge detector to detect a change in the output of said comparator.

12. The micromirror device of claim 11, said micromirror cell further comprising a switch for enabling a global reset signal when said edge detector detects a change in the output of said comparator.

13. The micromirror device of claim 11, said micromirror cell further comprising a reset generator for outputting a reset signal when said edge detector detects a change in the output of said comparator.

14. A micromirror cell comprising:

at least two address electrodes;

a deflectable mirror element suspended above said at least two address electrodes;

a capacitor for storing charge representing an image data signal;

a reference voltage generator for generating a reference voltage, said reference voltage generator operable to alter said reference voltage to adjust at least one image parameter selected from the group consisting of image brightness and image contrast; and a comparator receiving said image data signal and said reference voltage, said comparator comparing said reference voltage and said image data signal for at least one frame period, and providing address voltages to said at least two address electrodes to cause a deflection of said deflectable element, wherein said alteration of said reference voltage after said at least one frame period adjusts said at least one parameter.

15. The micromirror cell of claim 14, further comprising an edge detector to detect a change in the output of said comparator.

16. The micromirror cell of claim 15, further comprising a switch for enabling a global reset signal when said edge detector detects a change in the output of said comparator.

17. The micromirror cell of claim 15, further comprising a reset generator for outputting a reset signal when said edge detector detects a change in the output of said comparator.

18. A display system comprising:

a light source for providing a beam of light along a light path;

an array of micromirror cells on said light path, each micromirror cell operable to selectively reflect incident light along a projection path, each said micromirror cell comprising;

at least two address electrodes;

a deflectable mirror element suspended above said at least two address electrodes;

a capacitor for storing charge representing an image data signal;

a reference voltage generator for generating a reference voltage, said reference voltage generator operable to alter said reference voltage to adjust at least one image parameter selected from the group consisting of image brightness and image contrast; and a comparator receiving said image data signal and said reference voltage for at least one frame period, said comparator comparing said reference voltage input and said image data signal providing address voltages to said at least two address electrodes to cause a deflection of said deflectable element, wherein said alteration of said reference voltage after said at least one frame period adjusts said at least one parameter;

a controller providing said image data signal to said micromirror array; and projection optics on said projection path, said projection optics operable to focus said selectively reflected incident light on an image plane.

\* \* \* \* \*